(12) United States Patent
Roth et al.

(10) Patent No.: US 6,521,710 B1
(45) Date of Patent: Feb. 18, 2003

(54) GRAFTING OF ETHYLENICALLY UNSATURATED MONOMERS ONTO POLYMERS

(75) Inventors: Michael Roth, Lautertal (DE); Rudolf Pfaendner, Rimbach (DE); Peter Nesvadba, Marly (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/786,183

(22) PCT Filed: Aug. 23, 1999

(86) PCT No.: PCT/EP99/06172
§ 371 (c)(1),
(2), (4) Date: Mar. 1, 2001

(87) PCT Pub. No.: WO00/14135
PCT Pub. Date: Mar. 16, 2000

(51) Int. Cl.$^7$ .................................................. C08F 4/00
(52) U.S. Cl. .................. 525/259; 525/64; 525/263; 526/217; 526/220
(58) Field of Search ............................. 526/217, 220; 525/64, 259, 263

(56) References Cited

U.S. PATENT DOCUMENTS

| | | | |
|---|---|---|---|
| 4,581,429 A | 4/1986 | Solomon et al. | 526/220 |
| 5,627,248 A | 5/1997 | Koster et al. | 526/217 |
| 5,723,511 A | 3/1998 | Kazmaier et al. | 522/35 |
| 5,945,492 A | 8/1999 | Robert | 526/219.2 |
| 6,288,186 B1 * | 9/2001 | Matyjaszewski et al. | 526/230 |

FOREIGN PATENT DOCUMENTS

| | | |
|---|---|---|
| EP | 0837080 | 4/1998 |
| WO | 94/11412 | 5/1994 |
| WO | 97/36944 | 10/1997 |
| WO | 99/25749 | 5/1999 |

OTHER PUBLICATIONS

E. Malmström et al., Macromol. Chem. Phys. vol. 199, pp. 923–935. (1998).

* cited by examiner

Primary Examiner—James J. Seidleck
Assistant Examiner—Olga Asinovsky
(74) Attorney, Agent, or Firm—Tyler A. Stevenson

(57) ABSTRACT

The present invention relates to a process for the preparation of a grafted polymer wherein in a first step A) a stable nitroxyl radical is grafted onto a polymer, which step comprises heating a polymer and a nitroxyl-ether containing a group (=NO-X), wherein X is selected such, that cleavage of the O-X bond occurs and a radical X, is formed at about the melting temperature of the polymer; and in a second step B) the grafted polymer of step A) is heated in the presence of an ethylenically unsaturated monomer or oligomer to a temperature at which cleavage of the nitroxyl-polymer bond occurs and polymerization of the ethylenically unsaturated monomer or oligomer is initiated at the polymer radical; maintaining said temperature for further polymerization and afterwards cooling down the mixture to a temperature below 60° C. Further subjects are grafted thermoplastic polymers prepared by said process, the intermediate polymeric radical initiator, the use of the polymeric radical initiator and the use of NO-ethers for grafting thermoplastic polymers.

24 Claims, No Drawings

GRAFTING OF ETHYLENICALLY UNSATURATED MONOMERS ONTO POLYMERS

The present invention relates to a process for the preparation of grafted polymers wherein in a first step A) a stable nitroxyl radical is grafted onto a polymer, which step comprises heating a polymer and a compound containing a NO-ether to above the melting point of the polymer, mixing and reacting the components at said temperature; and in a second step B) the grafted polymer of step A) is heated in the presence of an ethylenically unsaturated monomer or oligomer to a temperature at which cleavage of the nitroxyl-polymer bond occurs. Further subjects of the present invention are grafted polymers prepared by said process, the intermediate polymeric radical initiator, the use of the polymeric radical initiator and the use of NO-ethers for grafting polymers.

Increasing activities have been directed towards chemical modifications of existing polymers in order to obtain functional and/or engineered new materials. Chemical modifications of existing polymers are important for at least two reasons: 1. They can be an inexpensive and rapid way of obtaining new polymers without having to search for new monomers; 2, they may be the only way to synthesize polymers with the intended new characteristics.

An important chemical modification is the free radical grafting of reactive monomers, which involves reaction of a polymer with a vinyl-group containing monomer or mixture of monomers capable of forming grafts onto the polymer backbone. If the grafts are long, the modified polymer becomes a true graft copolymer, of which the properties will be very different from those of the original polymer substrate. When the grafts are short with less than, for example five moieties, most of the physical and or mechanical properties of the modified polymer substrate will be retained.

The advantages of free radical-grafting are further gained with the use of batch mixers or screw extruders as chemical reactors, which allow the free radical-grafting reaction to occur without solvents. This is for example described by G. H. Hu et al., in "Reactive Modifiers for Polymers", first edition, Blackie Academic & Professional an Imprint of Chapman & Hall, London 1997, chapter 1, pages 1–97.

These free radical-grafting reactions are usually performed in the presence of a free radical source such as a peroxide and a reactive monomer, such as for example acrylic acid. However the use of free radical sources such as peroxides may cause undesired properties and lead to problems during processing (gel formation, crosslinking, molecular weight reduction) or during use. Typically the long term stability is reduced and/or the polymer cannot anymore be used in outdoor applications or in applications at elevated temperatures.

U.S. Pat. No. 4,581,429 to Solomon et al., issued Apr. 8, 1986, discloses a free radical polymerization process which controls the growth of polymer chains to produce short chain or oligomeric homopolymers and copolymers, including block and graft copolymers. The process employs an initiator having the formula (in part) R'R"N-O-X, where X is a free radical species capable of polymerizing unsaturated monomers.

Surprisingly it has now been found that with specific R'R"N-O-X compounds it is possible to produce a polymeric radical initiator by grafting the group R'R"N-O to the polymer and to use this macroinitiator for further grafting reactions of olefinically unsaturated monomers.

The polymerization processes and resin products of the present invention are useful in many applications, including a variety of specialty applications, such as for the preparation of grafted block copolymers which are useful as compatibilizing agents for polymer blends or dispersing agents for coating systems.

One subject of the present invention is a process for the preparation of a grafted polymer wherein in a first step A) a stable nitroxyl radical is grafted onto a polymer, which step comprises heating a polymer and a nitroxyl-ether containing a group (>NO-X), wherein X is selected such that cleavage of the O-X bond occurs and a radical X• is formed at about the melting temperature of the polymer; and in a second step B) the grafted polymer of step A) is heated in the presence of an ethylenically unsaturated monomer or oligomer to a temperature at which cleavage of the nitroxyl-polymer bond occurs and polymerization of the ethylenically unsaturated monomer or oligomer is initiated at the polymer radical; maintaining said temperature for further polymerization and afterwards cooling down the mixture to a temperature below 60° C.

The reaction mixture after step A) may also be cooled down to a temperature below 60° C. before further reaction of step B) is performed.

Optionally a free radical source is additionally present.

The reaction mixture after step A) may also be cooled down to a temperature below 60° C. before further reaction of step B) is performed.

Preferably the free radical source is a bis-azo compound, a peroxide or a hydroperoxide.

Specific preferred radical sources are 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethyvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl] propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6, 6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

Peroxides are most preferred.

Examples of suitable polymers are mentioned below.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(a-methylstyrene).

6. Copolymers of styrene or a-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or a-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyoletins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferred polymers are polyethylene, polypropylene, polystyrene, styrene block-copolymers, polybutadiene or polyisoprene, EPDM (ethylene-propylene diene monomer) or EPR (ethylene-propylene rubber).

More preferred are polyethylene, polypropylene, polybutadiene, SBS and EPDM (ethylene-propylene diene monomer).

One preferred nitroxyl-ether is of formula (X):

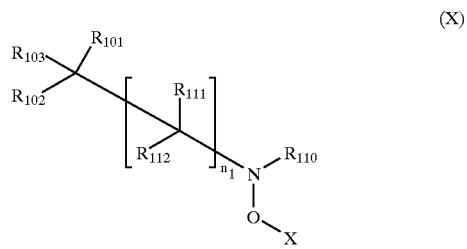

(X)

wherein $n_1$ is 0 or 1

$R_{101}$, $R_{102}$, $R_{103}$ are each independently of one another hydrogen, halogen, $NO_2$, cyano, $-CONR_{105}R_{106}$, $-(R_{109})COOR_{104}$, $-C(O)-R_{107}$, $-OR_{108}$, $-SR_{108}$, $-NHR_{108}$, $-N(R_{108})_2$, carbamoyl, di($C_1$-$C_{18}$alkyl)carbamoyl, $-C(=NR_{105})(NHR_{106})$;

unsubstituted $C_1$-$C_{18}$alkyl, $C_2$-$C_{18}$alkenyl, $C_2$-$C_{18}$alkynyl, $C_7$-$C_9$phenylalkyl, $C_3$-$C_{12}$cycloalkyl or $C_3$-$C_{12}$cycloalkyl containing at least one nitrogen or oxygen atom; or $C_1$-$C_{18}$alkyl, $C_2$-$C_{18}$alkenyl, $C_2$-$C_{18}$ alkynyl, $C_7$-$C_9$phenylalkyl, $C_3$-$C_{12}$cycloalkyl or $C_3$-$C_{12}$cycloalkyl containing at least one nitrogen or oxygen atom, which are substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino; or phenyl, which is unsubstituted or substituted by $C_1$-$C_4$alkyl, $C_1$-$C_4$alkoxy, $C_1$-$C_4$alkylthio, halogen, cyano, hydroxy, carboxy, $C_1$-$C_4$alkylamino or di($C_1$-$C_4$alkyl)amino;

or $R_{102}$ and $R_{103}$, together with the linking carbon atom, form a $C_3$-$C_{12}$ cycloalkyl radical, a ($C_4$-$C_{12}$ cycloalkanon)-yl radical or a $C_3$-$C_{12}$cycloalkyl radical containing at least one O atom and/or a $NR_{108}$ group; or if $n_1$ is 1:

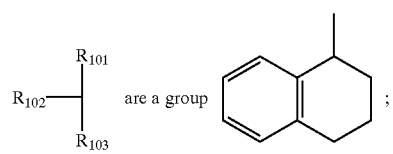

$R_{104}$ is hydrogen, $C_1$-$C_{18}$alkyl, phenyl, an alkali metal cation or a tetraalkylammonium cation;

$R_{105}$ and $R_{106}$ are hydrogen, $C_1$-$C_{18}$alkyl, $C_2$-$C_{18}$alkyl which is substituted by at least one hydroxy group or, taken together, form a $C_2$-$C_{12}$alkylene bridge or a $C_2$-$C_{12}$-alkylene bridge interrupted by at least one O or/and $NR_{108}$ atom;

$R_{107}$ is hydrogen, $C_1$-$C_{18}$alkyl or phenyl;

$R_{108}$ is hydrogen, $C_1$-$C_{18}$alkyl or $C_2$-$C_{18}$alkyl which is substituted by at least one hydroxy group;

$R_{109}$ is $C_1$–$C_{12}$alkylen or a direct bond:

$R_{110}$ is $C_4$–$C_{18}$alkyl bound via a tertiary C-atom to the nitrogen atom, $C_9$–$C_{11}$phenylalkyl, $C_3$–$C_{12}$cycloalkyl or $C_3$–$C_{12}$cycloalkyl containing at least one nitrogen or oxygen atom; or $C_4$–$C_{18}$alkyl bound via a tertiary C-atom to the nitrogen atom, $C_9$–$C_{11}$phenylalkyl, $C_3$–$C_{12}$cycloalkyl or $C_3$–$C_{12}$cycloalkyl containing at least one nitrogen or oxygen atom, which are substituted by $NO_2$, halogen, amino, hydroxy, cyano, carboxy, $C_1$–$C_4$alkoxy, $C_1$–$C_4$alkylthio, $C_1$–$C_4$alkylamino or di($C_1$–$C_4$alkyl)amino; or phenyl, naphthyl, which are unsubstituted or substituted by $C_1$–$C_4$alkyl, $C_1$–$C_4$alkoxy, $C_1$–$C_4$alkylthio, halogen, cyano, hydroxy, carboxy, $C_1$–$C_4$alkylamino or di($C_1$–$C_4$alkyl)amino;

if $n_1$ is 1

$R_{111}$ is $C_1$–$C_{18}$alkyl, $C_7$–$C_9$phenylalkyl, $C_3$–$C_{12}$cycloalkyl or $C_3$–$C_{12}$cycloalkyl containing at least one nitrogen or oxygen atom; or $C_1$–$C_{18}$alkyl, $C_7$–$C_9$phenylalkyl, $C_3$–$C_{12}$cycloalkyl or $C_3$–$C_{12}$cycloalkyl containing at least one nitrogen or oxygen atom, which are substituted by $NO_2$, halogen, amino, hydroxy, cyano, carboxy, $C_1$–$C_4$alkoxy, $C_1$–$C_4$alkylthio, $C_1$–$C_4$alkylamino or di($C_1$–$C_4$alkyl)amino; or phenyl, naphthyl, which are unsubstituted or substituted by $C_1$–$C_4$alkyl, $C_1$–$C_4$alkoxy, $C_1$–$C_4$alkylthio, halogen, cyano, hydroxy, carboxy, $C_1$–$C_4$alkylamino or di($C_1$–$C_4$alkyl)amino; or a polycyclic cycloaliphatic ring system or a polycyclic cycloaliphatic ring system with at least one di- or trivalent nitrogen atom; or $R_{110}$ and $R_{111}$ together form a $C_2$–$C_{12}$alkylene bridge, a $C_3$–$C_{12}$ alkylen-on bridge or a $C_2$–$C_{12}$alkylene bridge which is interrupted by at least one O or N atom, which bridges are unsubstituted or substituted with $C_1$–$C_{18}$alkyl, hydroxy($C_1$–$C_4$)alkyl, phenyl, $C_7$–$C_9$phenylalkyl, $NO_2$, halogen, amino, hydroxy, cyano, carboxy, $C_1$–$C_4$alkoxy, $C_1$–$C_4$alkylthio, $C_1$–$C_4$alkylamino or di($C_1$–$C_4$alkyl)amino, $R_{112}$ is hydrogen, -($R_{109}$)COOR$_{104}$, cyano, -OR$_{108}$, -SR$_{108}$, -NHR$_{108}$, -N(R$_{108}$)$_2$, -NH-C(O)-R$_{108}$, unsubstituted $C_1$–$C_{18}$alkyl, $C_2$–$C_{18}$alkenyl, $C_2$–$C_{18}$alkynyl, $C_7$–$C_9$phenylalkyl, $C_3$–$C_{12}$cycloalkyl or $C_3$–$C_{12}$cycloalkyl containing at least one nitrogen or oxygen atom; or $C_1$–$C_{18}$alkyl, $C_2$–$C_{18}$alkenyl, $C_2$–$C_{18}$ alkynyl, $C_7$–$C_9$phenylalkyl, $C_3$–$C_{12}$cycloalkyl or $C_3$–$C_{12}$cycloalkyl containing at least one nitrogen or oxygen atom, which are substituted by $NO_2$, halogen, amino, hydroxy, cyano, carboxy, $C_1$–$C_4$alkoxy, $C_1$–$C_4$alkylthio, $C_1$–$C_4$alkylamino or di($C_1$–$C_4$alkyl)amino; or phenyl, naphthyl, which are unsubstituted or substituted by $C_1$–$C_4$alkyl, $C_1$–$C_4$alkoxy, $C_1$–$C_4$alkylthio, halogen, cyano, hydroxy, carboxy, $C_1$–$C_4$alkylamino, di($C_1$–$C_4$alkyl)amino; or $R_{111}$ and $R_{112}$ together with the linking carbon atom form a $C_3$–$C_{12}$cycloalkyl radical.

Another preferred nitroxyl-ether is of formula XXa, XXb or XXc:

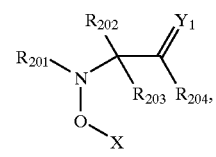
(XXa)

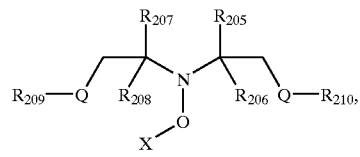
(XXb)

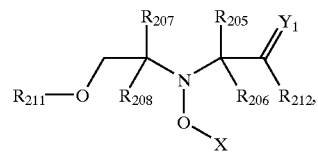
(XXc)

wherein $Y_1$ is O or $CH_2$;

Q is O or $NR_{220}$, wherein $R_{220}$ is hydrogen or $C_1$–$C_{18}$alkyl;

$R_{201}$ is tertiary $C_4$–$C_{18}$alkyl or phenyl, which are unsubstituted or substituted by halogen, OH, COOR$_{221}$ or C(O)-R$_{222}$ wherein $R_{221}$ is hydrogen, a alkali metal atom or $C_1$–$C_{18}$alkyl and $R_{222}$ is $C_1$–$C_{18}$alkyl; or $R_{201}$ is $C_5$–$C_{12}$cycloalkyl, $C_5$–$C_{12}$cycloalkyl which is interrupted by at least one O or N atom, a polycyclic alkyl radical or a polycyclic alkyl radical which is interrupted by at least one O or N atom;

$R_{202}$ and $R_{203}$ are independently $C_1$–$C_{18}$alkyl, benzyl, $C_5$–$C_{12}$cycloalkyl or phenyl, which are unsubstituted or substituted by halogen, OH, COOR$_{221}$ or C(O)-R$_{222}$ or together with the carbon atom form a $C_5$–$C_{12}$cycloalkyl ring;

if $Y_1$ is O, $R_{204}$ and $R_{212}$ are OH, O(alkali-metal) $C_1$–$C_{18}$alkoxy, benzyloxy, NR$_{223}$R$_{224}$, wherein $R_{223}$ and $R_{224}$ are independently from each other hydrogen, $C_1$–$C_{18}$alkyl or phenyl, which are unsubstituted or substituted by halogen, OH, COOR$_{221}$ or C(O)-R$_{222}$;

if $Y_1$ is $CH_2$, $R_{204}$ is OH, $C_1$–$C_{18}$alkoxy, benzyloxy, O-C(O)-($C_1$–$C_{18}$) alkyl or NR$_{223}$R$_{224}$;

$R_{212}$ are a group C(O)R$_{225}$, wherein $R_{225}$ is OH, $C_1$–$C_{18}$alkoxy, benzyloxy, NR$_{223}$R$_{224}$, wherein $R_{223}$ and $R_{224}$ are independently from each other hydrogen, $C_1$–$C_{18}$alkyl or phenyl, which are unsubstituted or substituted by halogen, OH, COOR$_{221}$ or C(O)-R$_{222}$;

$R_{205}$, $R_{206}$, $R_{207}$ and $R_{208}$ are independently of each other $C_1$–$C_{18}$alkyl, $C_5C_{12}$cycloalykyl or phenyl; or $R_{205}$ and $R_{206}$ and/or $R_{207}$ and $R_{208}$ together with the carbon atom form a $C_5$–$C_{12}$cycloalkyl ring;

$R_{209}$ and $R_{210}$ are independently of each other hydrogen, formyl, $C_2$–$C_{18}$alkylcarbonyl, benzoyl, $C_1$–$C_{18}$alkyl, $C_5$–$C_{12}$cycloalkyl, $C_5$–$C_{12}$cycloalkyl which is interrupted by at least one O or N atom, benzyl or phenyl which are unsubstituted or substituted by halogen, OH, COOR$_{221}$ or C(O)-R$_{222}$;

$R_{211}$, is formyl, $C_2$–$C_{18}$alkylcarbonyl, benzoyl, $C_1$–$C_{18}$alkyl, $C_5$–$C_{12}$cycloalkyl, $C_5$–$C_{12}$cycloalkyl which is interrupted by at least one O or N atom, benzyl or phenyl which are unsubstituted or substituted by halogen, OH, COOR$_{221}$ or C(O)-R$_{222}$.

Still another preferred nitroxyl-ether contains a structural element of formula (XXX):

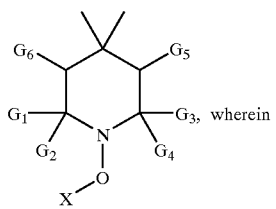
(XXX)
$G_1$, $G_2$, $G_3$, $G_4$ are independently $C_1$–$C_6$alkyl or $G_1$ and $G_2$ or $G_3$ and $G_4$, or $G_1$ and $G_2$ and $G_3$ and $G_4$ together form a $C_5$–$C_{12}$cycloalkyl group;
$G_5$, $G_6$ independently are H, $C_1$–$C_{18}$alkyl, phenyl, naphthyl or a group $COOC_1$–$C_{18}$alkyl.
More preferred is a nitroxyl-ether which is of formulae A to S:
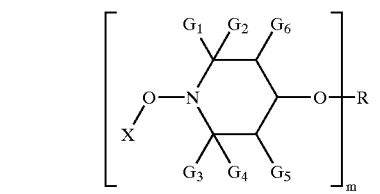
(A)
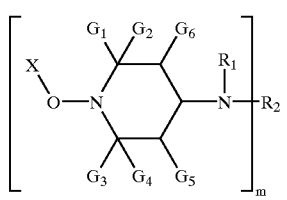
(B)
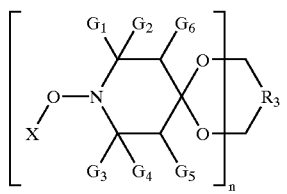
(C)
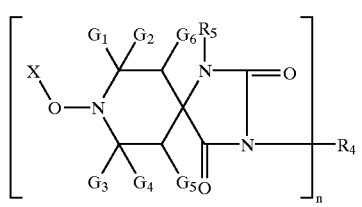
(D)
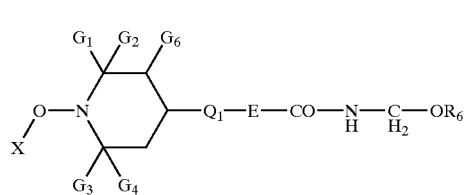
(E)
-continued
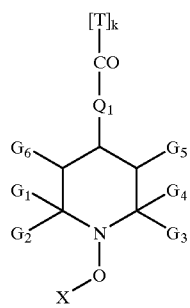
(F)
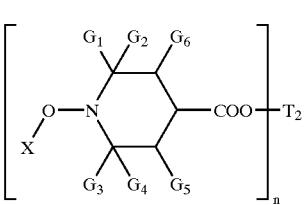
(G)
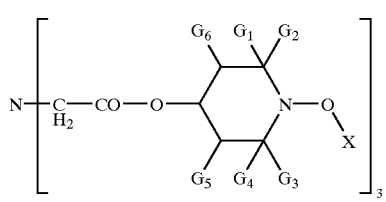
(H)
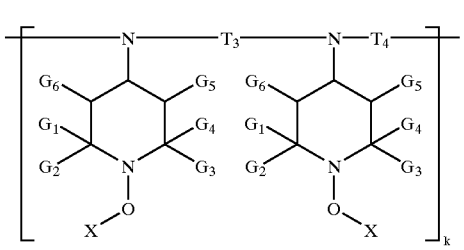
(I)
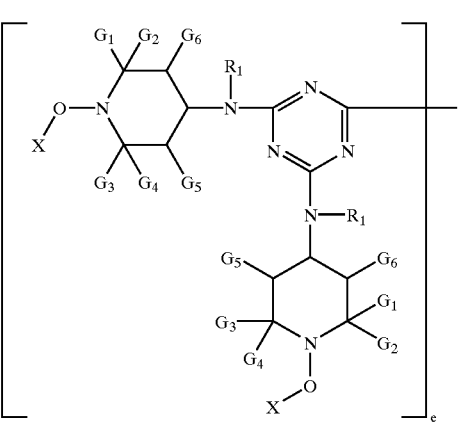
(K)
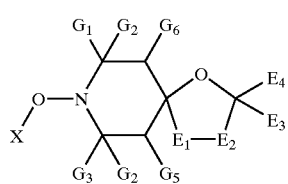
(L)

(M)
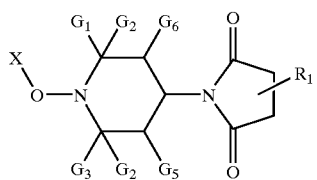

(N)
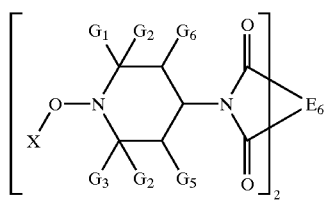

(O)
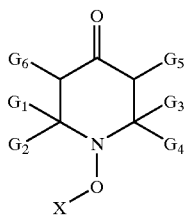

(P)
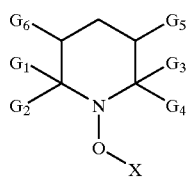

(Q)
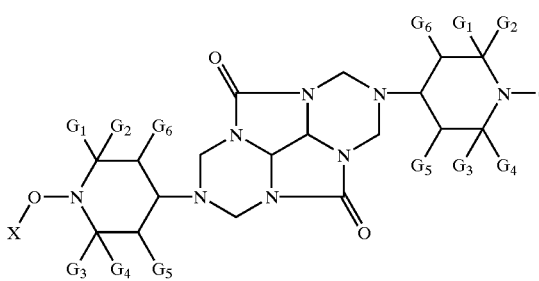

(R)
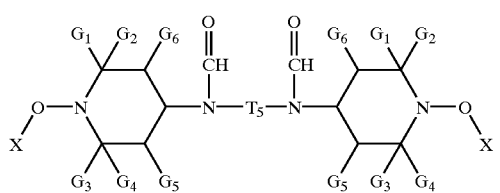

(S)
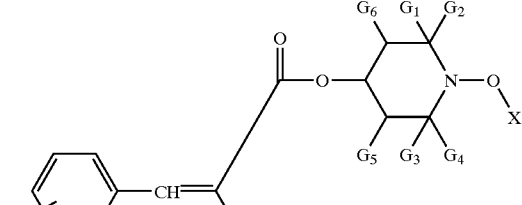
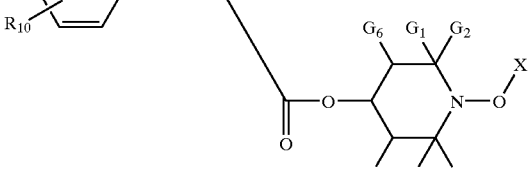

wherein $G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$–$C_4$ alkyl;

R, if m is 1, is hydrogen, $C_1$–$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 -$COOZ_{12}$ groups, in which $Z_{12}$ is H, $C_1$–$C_{20}$alkyl, $C_3$–$C_{12}$alkenyl, $C_5$–$C_7$cycloalkyl, phenyl or benzyl; or R is a monovalent radical of a carbamic acid or phosphorus-containing acid or a monovalent silyl radical;

R, if m is 2, is $C_2$–$C_{12}$alkylene, $C_4$–$C_{12}$alkenylene, xylylene, a divalent radical of an aliphatic dicarboxylic acid having 2 to 36 carbon atoms, or a cycloaliphatic or aromatic dicarboxylic acid having 8–14 carbon atoms or of an aliphatic, cycloaliphatic or aromatic dicarbamic acid having 8–14 carbon atoms, where each dicarboxylic acid may be substituted in the aliphatic, cycloaliphatic or aromatic moiety by one or two -$COOZ_{12}$ groups; or R is a divalent radical of a phosphorus-containing acid or a divalent silyl radical;

R, if m is 3, is a trivalent radical of an aliphatic, cycloaliphatic or aromatic tricarboxylic acid, which may be substituted in the aliphatic, cycloaliphatic or aromatic moiety by -$COOZ_{12}$, of an aromatic tricarbamic acid or of a phosphorus-containing acid, or is a trivalent silyl radical, R, if m is 4, is a tetravalent radical of an aliphatic, cycloaliphatic or aromatic tetracarboxylic acid; p is 1, 2 or 3, $R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

when p is $1_1$, $R_2$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl, a group of the formula -CH$_2$CH(OH)-Z or of the formula -CO-Z- or -CONH-Z wherein Z is hydrogen, methyl or phenyl; or when p is 2, $R_2$ is $C_2$–$C_{12}$alkylene, $C_6$–$C_{12}$-arylene, xylylene, a -CH$_2$CH(OH)CH$_2$-O-B-O-CH$_2$CH(OH)CH$_2$- group, wherein B is $C_2$–$C_{10}$alkylene, $C_6$–$C_{15}$arylene or $C_6$–$C_{12}$cycloalkylene; or, provided that $R_1$ is not alkanoyl, alkenoyl or benzoyl, $R_2$ can also be a divalent acyl radical of an aliphatic, cycloaliphatic or aromatic dicarboxylic acid or dicarbamic acid, or can be the group -CO-; or $R_1$ and $R_2$ together when p is 1 can be the cyclic acyl radical of an aliphatic or aromatic 1,2- or 1,3-dicarboxylic acid; or $R_2$ is a group:

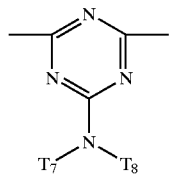

where $T_7$ and $T_8$ are independently hydrogen, alkyl of 1 to 18 carbon atoms, or $T_7$ and $T_8$ together are alkylene of 4 to 6 carbon atoms or 3-oxapentamethylene;

when p is 3, $R_2$ is 2,4,6-triazinyl;

when n is 1, $R_3$ is $C_2$–$C_8$alkylene or hydroxyalkylene or $C_4$–$C_{22}$acyloxyalkylene; or when n is 2, $R_3$ is (-CH$_2$)$_2$C(CH$_2$-)$_2$;

when n is 1, $R_4$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$-alkoxyalkyl, $C_6$–$C_{10}$-aryl, glycidyl, a group of formula -(CH$_2$)$_m$-COO-Q or of the formula -(CH$_2$)$_m$-O-CO-Q wherein m is 1 or 2 and Q is $C_1$–$C_4$-alkyl or phenyl; or when n is 2, $R_4$ is $C_2$–$C_{12}$alkylene, $C_6$–$C_{12}$-arylene, a group -CH$_2$CH(OH)CH$_2$-O-D-O-CH$_2$CH(OH)CH$_2$- wherein D is $C_2$–$C_{10}$alkylene, $C_6$–$C_{15}$arylene or $C_6$–$C_{12}$cycloalkylene, or a group -CH$_2$CH(OZ$_1$)CH$_2$-(OCH$_2$CH(OZ$_1$)CH$_2$)$_2$- wherein $Z_1$ is hydrogen, $C_1$–$C_{18}$alkyl, allyl, benzyl, $C_2$–$C_{12}$alkanoyl or benzoyl;

$R_5$ is hydrogen, $C_1$–$C_{12}$alkyl, allyl, benzyl, glycidyl or $C_2$–$C_6$alkoxyalkyl;

$Q_1$ is -N(R$_7$)- or -O-;

E is $C_1$–$C_3$alkylene, the group -CH$_2$CH(R$_8$)-O- wherein $R_8$ is hydrogen, methyl or phenyl, the group -(CH$_2$)$_3$-NH- or a direct bond;

$R_7$ is $C_1$–$C_{18}$alkyl, $C_5$–$C_7$-ycloalkyl, $C_7$–$C_{12}$aralkyl, cyanoethyl, $C_6$–$C_{10}$aryl, the group -CH$_2$CH(R$_8$)-OH; or a group of the formula:

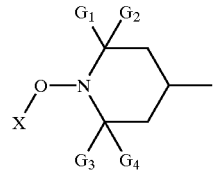

or a group of the formula:

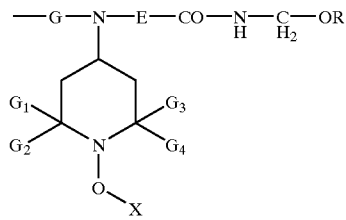

wherein G is $C_2$–$C_6$alkylene or $C_6$–$C_{12}$arylene and R is as defined above; or $R_7$ is a group -E-CO-NH-CH$_2$-OR$_6$;

$R_6$ is hydrogen or $C_1$–$C_{18}$alkyl;

Formula (F) denotes a recurring structural unit of a oligomer where T is ethylene or 1,2-propylene, or is a repeating structural unit derived from an α-olefin copolymer with an alkyl acrylate or methacrylate;

k is 2 to 100;

and $R_{10}$ is hydrogen, $C_1$–$C_{12}$alkyl or $C_1$–$C_{12}$alkoxy;

$T_2$ has the same meaning as $R_4$;

$T_3$ and $T_4$ are independently alkylene of 2 to 12 carbon atoms, or $T_4$ is a group:

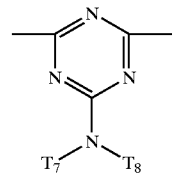

$T_5$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene);

$T_6$ is

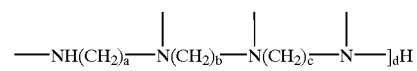

where a, b and c are independently 2 or 3, and d is 0 or 1;

e is 3 or 4;

$E_1$ and $E_2$, being different, are each oxo or imino;

$E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms;

$E_4$ is hydrogen, alkyl of 1 to 30 carbon atoms, phenyl, naphthyl or phenylalkyl of 7 to 12 carbon atoms; or $E_3$ and $E_4$ together are polymethylene of 4 to 17 carbon atoms, or said polymethylene substituted by up to four alkyl groups of 1 to 4 carbon atoms; and $E_6$ is an aliphatic or aromatic or aromatic tetravalent radical.

Further suitable heterocyclic nitroxyl-ether are for example mentioned in WO 98/30601 or in WO 98/44008, which are incorporated by reference.

Alkyl with up to 20 carbon atoms is, for example, methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl. The alkyl groups may be linear or branched.

$C_3$–$C_{18}$alkyl which is interrupted by one or more oxygen atoms is preferably derived from ethylene oxide or propylene oxide.

$C_3$–$C_{18}$alkyl interrupted by at least one O atom is for example -$CH_2$-$CH_2$-O-$CH_2$-$CH_3$, -$CH_2$-$CH_2$-O-$CH_3$ or -$CH_2$-$CH_2$-O-$CH_2$-$CH_2$-$CH_2$-O-$CH_2$-$CH_3$. It is preferably derived from polyethlene glycol. A general description is -$((CH_2)_a$-$O)_b$-H/$CH_3$, wherein a is a number from 1 to 6 and b is a number from 2 to 10.

$C_3$–$C_{12}$alkenyl is linear or branched and for example propenyl, butenyl, pentenyl, hexenyl, heptenyl, octenyl, dodecenyl including their isomers.

$C_3$–$C_8$alkynyl is preferably propargyl.

$C_5$–$C_{12}$cycloalkyl is typically, cyclopentyl, methylcyclopentyl, dimethylcyclopentyl, cyclohexyl, methylcyclohexyl.

Cycloalkyl which is interrupted by at least one O or N atom is for example 2-tetrahydropyran-yl, tetrahydrofurane-yl, 1,4 dioxan-yl, pyrrolidin-yl, tetrahydrothiophen-yl, pyrazolidin-yl, imidazolidin-yl, butyrolactone-yl, caprolactame-yl Examples for alkali metal are lithium, sodium or potassium.

Alkyl substituted by-OH is typically 2-hydroxyethyl, 2-hydroxypropyl or 2-hydroxybutyl.

$C_1$–$C_{18}$alkoxy is, for example, methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy.

$C_1$–$C_{18}$Alkyl substituted by $C_1$–$C_8$alkoxy, preferably by $C_1$–$C_4$alkoxy, in particular by methoxy or ethoxy, is typically 2-methoxyethyl, 2-ethoxyethyl, 3-methoxypropyl, 3-ethoxyropyl, 3-butoxypropyl, 3-octoxypropyl and 4-methoxybutyl.

$C_1$–$C_{18}$Alkyl substituted by di($C_1$–$C_4$alkyl)amino is preferably e.g. dimethylamino, diethylamino, 2-dimethylaminoethyl, 2-diethylaminoethyl, 3-dimethylaminopropyl, 3-diethylaminopropyl, 3-dibutylaminopropyl and 4-diethylaminobutyl.

$C_1$–$C_{18}$Alkyl substituted by $C_1$–$C_4$alkylamino is preferably e.g. methylamino, ethylamino, 2-methylaminoethyl, 2-ethylaminoethyl, 3-methylaminopropyl, 3-ethylaminopropyl, 3-butylaminopropyl and 4-ethylaminobutyl.

$C_1$–$C_4$Alkylthio is typically thiomethyl, thioethyl, thiopropyl, thioisopropyl, thiobutyl and thioisobutyl.

$C_2$–$C_{18}$ alkylcarbonyl is for example acetyl, propionyl, butyryl, pentylcarbonyl, hexylcarbonyl or dodecylcarbonyl.

$C_7$–$C_9$phenylalkyl or $C_7$–$C_9$aralkyl is for example benzyl, phenylethyl, phenylpropyl, α,α-dimethylbenzyl or α-methylbenzyl.

Examples of $C_2$–$C_{12}$alkylene bridges, preferably of $C_2$–$C_6$alkylene bridges, are ethylene, propylene, butylene, pentylene, hexylene.

$C_2$–$C_{12}$alkylene bridges interrupted by at least one N or O atom are, for example, -$CH_2$-O-$CH_2$-$CH_2$-, -$CH_2$-O-$CH_2$-$CH_2$-$CH_2$-, -$CH_2$-O-$CH_2$-$CH_2$-$CH_2$-$CH_2$-, -$CH_2$-O-$CH_2$-$CH_2$-O-$CH2$-, -$CH_2$-NH-$CH_2$-$CH_2$-, -$CH_2$-NH-$CH_2$-$CH_2$-$CH_2$-, -$CH_2$-NH-$CH_2$-$CH_2$-$CH_2$-$CH_2$-, -$CH_2$-NH-$CH_2$-$CH_2$-NH-$CH_2$- or -$CH_2$-NH-$CH_2$-$CH_2$-O-$CH2$-.

Examples for $C_4$–$C_{12}$cycloalkanone-yl are cyclopentanone-yl, cyclohexanone-yl or cycloheptanone-yl.

Phenyl substituted by 1, 2 or 3 $C_1$–$C_4$alkyl or $C_1$–$C_4$alkoxy is typically methylphenyl, dimethylphenyl, trimethylphenyl, t-butylphenyl, di-t-butylphenyl, 3,5-di-t-butyl-4-methylphenyl, methoxyphenyl, ethoxyphenyl and butoxyphenyl.

Examples of polycyclic cycloaliphatic ring systems are adamantane, cubane, twistane, norbornane, bycyclo[2.2.2] octane or bycyclo[3.2.1]octane.

An example of a polycyclic heterocycloaliphatic ring system is hexamethylentetramine (urotropine).

Examples of monocarboxylic acids with 1 to 18 carbon atoms are formic acid, acetic acid, propionic acid, phenyl acetic acid, cyclohexane carbonic acid, mono-, di- and trichlor-acetic acid or mono-, di- and trifluor-acetic acid. Other suitable acids are benzoic acid, chlor-benzoic acid, methanesulfonic acid, ethanesulfonic acid, benzenesulfonic acid, p-toluenesulfonic acid, chlorbenzenesulfonic acid, trifluormethanesulfonic acid, methylphosphonic acid or phenylphosphonic acid.

Examples of a monovalent radical of a carboxylic acid are an acetyl, caproyl, stearoyl, acryloyl, methacryloyl, cyclohexylcarboxylic acid, benzoyl or β-(3,5-di-tert-butyl-4-hydroxyphenyl)-propionyl radical.

Further examples are derived from propionic acid, laurinic acid or methyl ethyl acetic acid or the other isomers of valeric acid.

Examples of a cycloaliphatic carboxylic acid is for example cyclohexane carboxylic acid or cyclopentane carboxylic acid.

An example of an aromatic carboxylic acid is benzoic acid.

Typical unsaturated carboxylic acids are acrylic acid, methacrylic acid or crotonic acid.

Examples of a monovalent silyl radical are of the formula -$(C_jH_{21})$-Si(Z')$_2$Z", in which j is an integer in the range from 2 to 5, and Z' and Z", independently of one another, are $C_1$–$C_4$alkyl or $C_1$–$C_4$alkoxy.

Examples of di-, tri- and tetra valent acids are for example malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl) malonyl or bicycloheptenedicarbonyl radical or a group of the formula:

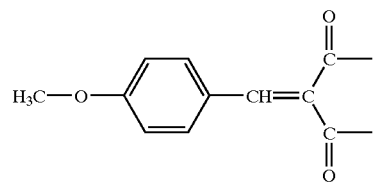

trimellitoyl, citryl or nitrilotriacetyl, butane-1,2,3,4-tetracarboxylic acid or pyromellitic acid.

Examples of a dicarbamic acid are the hexamethylenedicarbamoyl or 2,4-toluylenedicarbamoyl radicals.

$C_2$–$C_{12}$alkanoyl is, for example, propionyl, butyryl, octanoyl, dodecanoyl, but preferably acetyl.

Hydroxyl-, cyano-, alkoxycarbonyl- or carbamide-substituted alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene radicals are, for example, ethylene, propylene, 2,2-dimethylpropylene, tetramethylene, hexamethylene, octamethylene, decamethylene or dodecamethylene.

$C_4$–$C_{12}$alkenylene is for example butenylene, pentenylene, hexenylene, heptenylene or nonenylene including their isomers.

$C_6$–$C_{12}$arylene is, for example, o-, m- or p-phenylene, 1,4-naphthylene or 4,4'-diphenylene.

$C_4$–$C_{22}$acyloxyalkylene is, for example, 2-ethyl-2-acetoxymethylpropylene.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_1$–$C_{18}$alkanoyloxy is, for example, formyloxy, acetyloxy, propionyloxy, butyryloxy, valeryloxy, lauroyloxy, palmitoyloxy and stearoyloxy.

The nitroxyl-ethers of formula (X) are known and may be prepared according to WO 99/03984, EP-A-0 891 986 or WO 98/13392.

Some typical examples are given below:

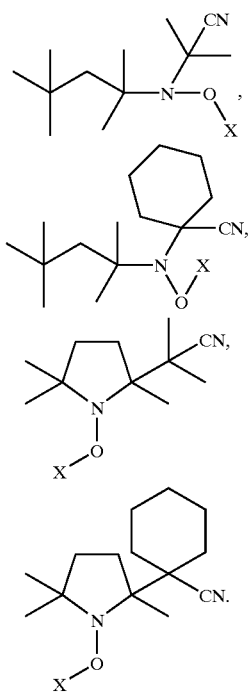

The nitroxyl-ethers of formula XXa, b and c are also known and may be prepared according to European Patent Application No. 98810741.3.

Typical examples are given below:

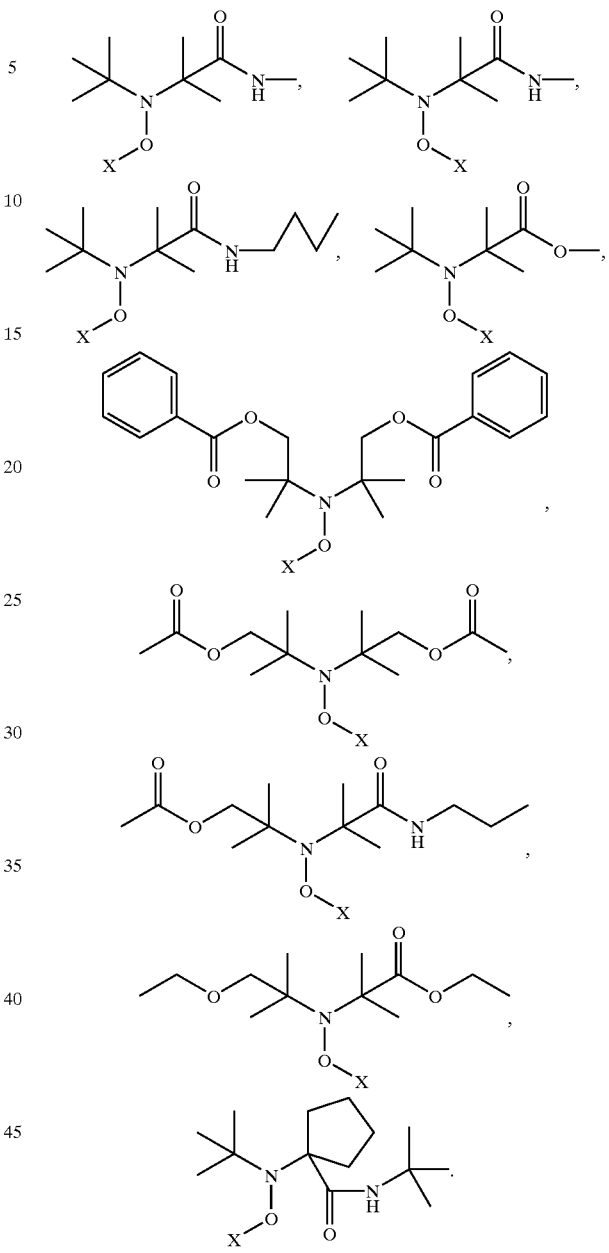

The nitroxyl-ethers of formula XXX are also known and can be prepared as described in European Patent Application No. 98810531.8.

Furthermore DE 26 21 841, U.S. Pat. No. 4,131,599 and DE 26 30 798 for example describe the preparation of 2,6-diethyl-2,3,6-trimethyl-4-oxopiperidine and 2,6-dipropyl-3-ethyl-2,6-dimethyl-4-oxo-piperidine, which are intermediates for the corresponding 1-oxo and nytroxyl-ether compounds.

Another method for the preparation of 2,2-dimethyl-6,6-dialkyl-4-oxopiperidine is described by F. Asinger. M. Thiel, H. Baltz, Monatshefte für Chemie 88, 464 (1957) or by J. Bobbittt et al. in J. Org. Chem. 58, 4837 (1993).

The oxidation of the piperidine compound to 1-oxo-piperidine derivatives is well known in the art and for example described by L. B. Volodarsky, V. A. Reznikov, V.

I. Ovcharenko in Synthetic Chemistry of Stable Nitroxides, CRC Press, Boca Raton 1994.

The tetramethylpiperidine precursors are partially commercially available or can be prepared according to known methods. For example U.S. Pat. No. 5,096,950 and the documents cited therein describe the preparation of the precursors. The oxidation and ether forming process can be done as described above.

Examples are given below:

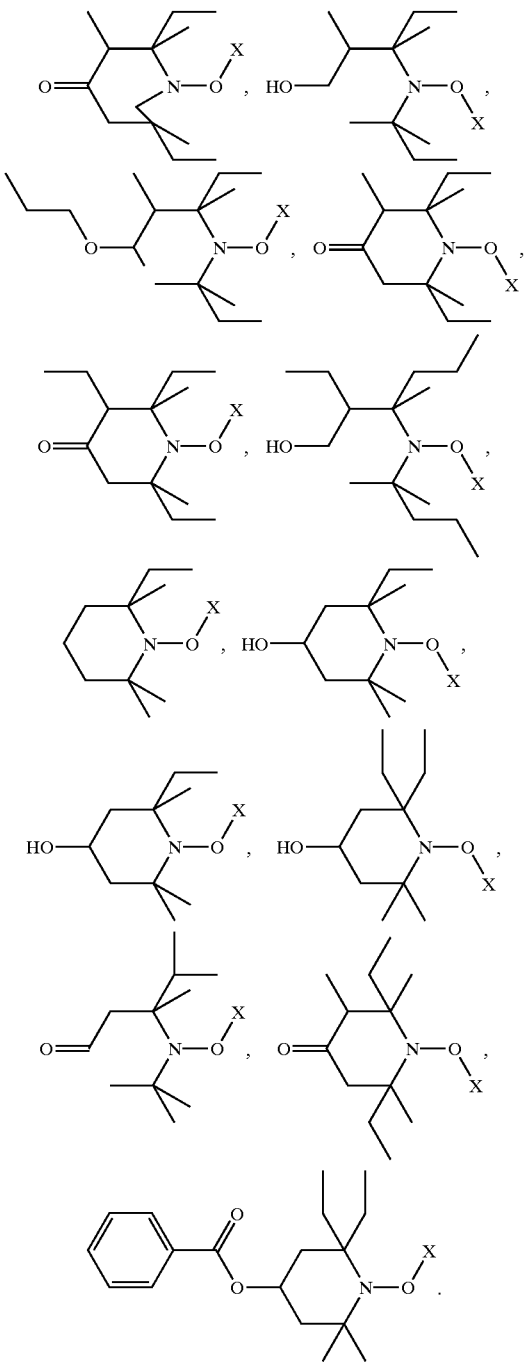

Preferably $G_1$, $G_2$, $G_3$ and $G_4$ are methyl or ethyl and $G_5$ and $G_6$ are hydrogen or methyl.

More Preferably $G_1$, $G_2$, $G_3$ and $G_4$ are methyl and $G_5$ and $G_6$ are hydrogen.

Another preferred group of compounds are those wherein $G_1$ and $G_3$ are ethyl and $G_2$ and $G_4$ are methyl, or $G_1$ and $G_4$ are ethyl and $G_2$ and $G_3$ are methyl, and one of $G_5$ or $G_6$ is hydrogen and the other methyl or both are hydrogen.

Preferably X is selected from the group consisting of $C_1$–$C_{18}$alkyl, $C_3$–$C_{18}$alkenyl, $C_3$–$C_{18}$alkinyl, phenyl, phenyl($C_7$–$C_{11}$)alkyl, phenyl or phenyl($C_7$–$C_{11}$)alkyl substituted by $C_1$–$C_{12}$alkyl, $C_1$–$C_{12}$alkoxy, OH, amino, $C_1$–$C_{12}$alkylamino, $C_1$–$C_{12}$dialkylamino, $NO_2$ or halogen, $C_2$–$C_7$cycloalkyl, or a group

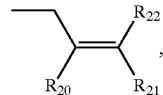

wherein
$R_{20}$, $R_{21}$, and $R_{22}$ are hydrogen or $C_1$–$C_{12}$alkyl, $C_2$–$C_{12}$alkenyl, phenyl or $C_3$–$C_7$cycloalkyl.

More preferably X is selected from the group consisting of $C_1$–$C_{18}$alkyl, benzyl, allyl, cyclopentyl or cyclohexyl.

Most preferred are allyl and cyclohexyl.

A preferred subgroup are compounds of the structural formulae A, B, O or P, wherein m is 1, R is hydrogen, $C_1$–$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_2$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl, a group of the formula -$CH_2CH$(OH)-Z or of the formula -CO-Z or -CONH-Z wherein Z is hydrogen, methyl or phenyl.

More preferred are those of structure A or B, wherein R is hydrogen, $C_1$–$C_{18}$alkyl, cyanoethyl, benzoyl, glycidyl, a monovalent radical of an aliphatic carboxylic acid, having 2 to 18 carbon atoms;

$R_1$ is $C_1$–$C_{12}$alkyl, $C_7$–$C_8$aralkyl, $C_2$–$C_{18}$alkanoyl, $C_3$–$C_5$alkenoyl or benzoyl;

$R_2$ is $C_1$–$C_{18}$alkyl, glycidyl, a group of the formula -$CH_2CH$(OH)-Z or of the formula -CO-Z, wherein Z is hydrogen, methyl or phenyl.

Another preferred subgroup is wherein the nitroxyl-ether is a compound of formula (X), $n_1$ is 1

$R_{101}$ is cyano;

$R_{102}$ and $R_{103}$ are each independently of one another unsubstituted $C_1$–$C_{12}$alkyl or phenyl;

or R102 and $R_{103}$, together with the linking carbon atom, form a $C_5$–$C_7$cycloalkyl radical;

$R_{110}$ is $C_4$–$C_{12}$alkyl bound via a tertiary C-atom to the nitrogen atom, $C_9$–$C_{11}$phenylalkyl or phenyl; or $R_{110}$ and $R_{111}$ together form a $C_2$–$C_6$alkylene bridge which is unsubstituted or substituted with $C_1$–$C_4$alkyl; and $R_{112}$ is $C_1$–$C_4$alkyl.

A further preferred subgroup is wherein the nitroxyl-ether is a compound of formula (XXa), Y is O;
$R_{201}$ is tertiary $C_4$–$C_8$alkyl;
$R_{202}$ and $R_{203}$ are methyl, ethyl or together with the carbon atom form a $C_5$–$C_6$cycloalkyl ring;
$R_{204}$ is $C_1$–$C_{18}$alkoxy, benzyloxy or $NR_{223}R_{224}$, wherein $R_{223}$ and $R_{224}$ are independently of each other hydrogen or $C_1$–$C_8$alkyl;
or of formula (XXb), wherein $Q_1$ is O;
$R_{205}$, $R_{206}$, $R_{207}$ and $R_{208}$ are independently of each other methyl or ethyl; or
$R_{205}$ and $R_{206}$ and/or $R_{207}$ and $R_{208}$ together with the carbon atom form a $C_5$–$C_6$cycloalkyl ring;
$R_{209}$ and $R_{210}$ are independently of each other formyl, $C_2$–$C_8$alkylcarbonyl, benzoyl, $C_1$–$C_8$alkyl, benzyl or phenyl;
or of formula (XXc), wherein $Y_1$ is O;
$R_{205}$, $R_{206}$, $R_{207}$ and $R_{208}$ are independently of each other methyl or ethyl; or
$R_{205}$ and $R_{206}$ and/or $R_{207}$ and $R_{208}$ together with the carbon atom form a $C_5$–$C_6$cycloalkyl ring;
$R_{211}$ is formyl, $C_2$–$C_{18}$alkylcarbonyl, benzoyl, $C_1$–$C_{18}$alkyl, benzyl or phenyl and
$R_{212}$ is OH, $C_1$–$C_{18}$alkoxy, benzyloxy, $NR_{223}R_{224}$, wherein $R_{223}$ and $R_{224}$ are independently of each other hydrogen or $C_1$–$C_{18}$alkyl.

Preferably the polymer to be grafted on contains unsaturated moieties selected from the group consisting of polydienes, co-, block-, random- and tapered polymers of styrene, terpolymers with diolefins and copolymers with diolefins.

Preferred unsaturated polymers are polybutadiene, polyisoprene, styrene-isoprene-block-copolymers (SI, SIS), styrene-butadiene-block-copolymers (SB, SBS, SEBS), ABS, EPDM, butyl rubber, chloroprene rubber and nitrile rubber having a content of unsaturated repeating units from 0.1 to 85%. Mostly preferred are SB, SBS, EPDM having a content of unsaturated repeating units from 1 to 70%.

Preferably the ethylenically unsaturated monomer or oligomer is selected from the group consisting of styrene, substituted styrene, conjugated dienes, acrolein, vinyl acetate, (alkyl)acrylic acidanhydrides, (alkyl)acrylic acid salts, (alkyl)acrylic esters or (alkyl)acrylamides. More preferably the ethylenically unsaturated monomer is styrene, α-methyl styrene, p-methyl styrene or a compound of formula $CH_2=C(R_a)-(C=Z)-R_b$, wherein $R_a$ is hydrogen or $C_1$–$C_4$alkyl, $R_b$ is $NH_2$, $OCH_3$, glycidyl, unsubstituted $C_1$–$C_{18}$alkoxy or hydroxy-substituted $C_1$–$C_{18}$alkoxy, unsubstituted $C_1$–$C_{18}$alkylamino, di($C_1$–$C_{18}$alkyl)amino, hydroxy-substituted $C_1$–$C_{18}$alkylamino or hydroxy-substituted di($C_1$–$C_{18}$alkyl)amino;
Me is a monovalent metal atom
Z is oxygen or sulfur.

Most preferably $R_a$ is hydrogen or methyl, $R_b$ is $NH_2$, gycidyl, unsubstituted or with hydroxy substituted $C_1$–$C_4$alkoxy, unsubstituted $C_1$–$C_4$alkylamino, di($C_1$–$C_4$alkyl)amino, hydroxy-substituted $C_1$–$C_4$alkylamino or hydroxy-substituted di($C_1$–$C_4$alkyl)amino;and
Z is oxygen.

Specifically preferred ethylenically unsaturated monomers are methylacrylate, ethylacrylate, butylacrylate, isobutylacrylate, tert, butylacrylate, hydroxyethylacrylate, hydroxypropylacrylate, dimethylaminoethylacrylate, glycidylacrylates, methyl(meth)acrylate, ethyl(meth) acrylate, butyl(meth)acrylate, hydroxyethyl(meth)acrylate, hydroxypropyl(meth)acrylate, dimethylaminoethyl(meth) acrylate, glycidyl(meth)acrylates, acrylonitrile, acrylamide or methacrylamide.

The temperature applied in the first reaction step depends on the polymer and is for example 50° to 150° C. above the glass transition temperature (Tg) for amorphous polymers and 20° to 180° C. above the melting temperature (Tm) for semi-crystalline polymers. Typical are following temperatures:

| low density polyethylene | LDPE | 170–260° C. |
| high density polyethylene | HDPE | 180–270° C. |
| polypropylene | PP | 180–280° C. |
| polystyrene | PS | 190–280° C. |
| styrene-block copolymers | SB(S) | 180–260° C. |
| ethylene-propylene-diene modified | EPDM | 180–260° C. |
| ethylene propylene rubber | EPR | 180–260° C. |

In a preferred process the temperature in the first step A) is from 150° C. to 300° C., more preferred from 170° C. to 280° C.

Preferably the temperature in the second step B) is from 70° to 280° C., more preferably from 70° to 210° C.

If a temperature of 120° to 180° C. is applied, the group X is preferably allyl or benzyl.

If a temperature of 180° to 240° C. is applied the group X is preferably benzyl or cyclohexyl.

If a temperature of 240° to 300° C. is applied the group X is preferably cyclohexyl or alkyl.

Preferably the nitroxyl-ether is present in an amount from 0.1% to 30%, more preferably in an amount from 1% to 20% and most preferably in an amount from 1% to 10% based on the weight of the polymer.

Preferably the ratio of the reaction product of step A) to the ethylenically unsaturated monomer or oligomer added in step B) is from 1:10000 to 10:1, more preferably from 1:1000 to 1:1 and most preferably from 1:500 to 1:1.

Step A) of the process may be performed in any reactor suitable for mixing a polymer melt. Preferably the reactor is an extruder or kneading apparatus as for example described in "Handbuch der Kunststoffextrusion" Vol.I, editor F. Hensen, W. Knappe and H. Potente, 1989, pages 3–7. If an extruder is used the process may be described as reactive extrusion process. Examples of reactiv extrusion equipment and processes are given by G. H. Hu et al., in "Reactive Modifiers for Polymers", first edition, Blackie Academic & Professional an Imprint of Chapman & Hall, London 1997, chapter 1, pages 1–97.

Preferably, if an extruder is used, a reduced pressure of less than 200 mbar is applied during extrusion. Volatile byproducts are removed thereby.

The reaction time for step A) depends on the desired amount of grafted ONR'R" initiator moieties. Typical reaction times are from a few minutes to an hour. Preferably the reaction time is from 1 min to 1 h, most preferably from 2 min to 20 min.

The reaction step B) may be performed immediately after step A), however it is also possible to store the intermediate polymeric radical initiator at room temperature for some time. The intermediate polymeric radical initiator is stable at room temperature and no loss of activity occurs up to several months.

The reaction for step B) may be performed in any reactor suitable for mixing a polymer melt with a monomer. The degree of grafting depends on the reaction time, on the temperature used and the activity of the polymeric initiator. Preferably the reaction time for step B) is from 1 min to 20 hours, more preferably from 30 min to 5 hours.

If the reaction step B) is performed in an extruder, a reaction time of 2 to 20 minutes is preferred.

The grafted polymers are useful in many applications such as compatibilizers in polymer blends or alloys, adhesion promoters between two different substrates, surface modification agents, nucleating agents, coupling agents between filler and polymer matrix or dispersing agents.

The process is particularly useful for the preparation of grafted block copolymers.

Grafted block copolymers are, for example, grafted block copolymers of polystyrene and polyacrylate (e.g., poly (styrene-co-acrylate) or poly(styrene-co-acrylate-co-styrene). They are usefull as adhesives or as compatibilizers for polymer blends or as polymer toughening agents. Poly (methylmethacrylate-co-acrylate) diblock graft copolymers or poly(methylacrylate-co-acrylate-co-methacrylate) triblock graft copolymers are useful as dispersing agents for coating systeme, as coating additives (e.g. rheological agents, compatibilizers, reactive diluents) or as resin component in coatings(e.g. high solid paints) Graft block copolymers of styrene, (meth)acrylates and/or acrylonitrile are useful for plastics, elastomers and adhesives.

Furthermore, graft block copolymers of this invention, wherein the grafted blocks have polar monomers on a non polar polymer are useful in many applications as amphiphilic surfactants or dispersants for preparing highly uniform polymer blends.

Thus, the present invention also encompasses in the synthesis novel graft block, multi-block, star, gradient, random, hyperbranched and dendritic copolymers.

The polymers prepared by the present invention are particularly useful for following applications:

adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

Because the present graft polymerizaton is a "living" polymerization, it can be started and stopped practically at will. Furthermore, the polymer product retains the functional alkoxyamine group allowing a continuation of the polymerization in a living matter. Thus, in one embodiment of this invention, once the first monomer is consumed in the initial polymerizing step a second monomer can then be added to form a second block on the growing graft polymer chain in a second polymerization step. Therefore it is possible to carry out additional graft polymerizations with the same or different monomer(s) to prepare multi-block graft copolymers.

Furthermore, since this is a radical polymerization, graft blocks can be prepared in essentially any order.

Consequently further subjects of the present invention are a polymeric radical initiator prepared according to step A) of the process without an additional free radical source and a polymeric radical initiator prepared according to step A) of the process with an additional free radical source.

Another subject of the invention are the grafted polymers obtainable by according to A) and B) of the process described above.

The polymeric radical initiator obtainable by step A) of the above process is schematically represented in formula (P1):

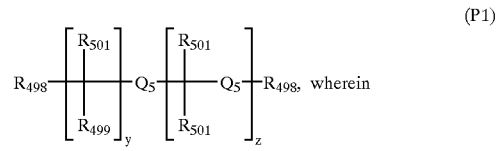

(P1)

wherein $R_{498}$ is hydrogen, substituted or unsubstituted $C_1$–$C_{18}$alkyl, $C_2$–$C_{18}$alkenyl, $C_2$–$C_{18}$alkinyl; $C_3$–$C_{20}$cycloalkyl or $C_3$–$C_{12}$cycloalkyl containing at least one nitrogen or oxygen atom or $C_3$–$C_{12}$cycloalkyl containing at least one nitrogen or oxygen atom, which are substituted by $NO_2$, halogen, amino, hydroxy, cyano, carboxy; $C_1$–$C_4$alkoxy, $C_1$–$C_4$alkylthio, $C_1$–$C_4$alkylamino or di($C_1$–$C_4$alkyl)amino, O($C_1$–$C_{18}$alkyl), O($C_2$–$C_{18}$alkeny), $C_7$–$C_{11}$phenylalkyl, O-phenyl, O$C_7$–$C_9$phenylalkyl or halogen or phenyl and naphthyl which are unsubstituted or substituted by $C_1$–$C_4$alkyl, $C_1$–$C_4$alkoxy, $C_1$–$C_4$alkylthio, halogen, cyano, hydroxy, carboxy, $C_1$–$C_4$alkylamino or di($C_1$–$C_4$alkyl)amino;

$R_{499}$ is the stable nitroxyl radical, bound at the oxygen atom;

$R_{500}$ is substituted or unsubstituted $C_1$–$C_{18}$alkyl, $C_2$–$C_{18}$alkenyl, $C_3$–$C_{20}$cycloalkyl, phenyl, $C_7$–$C_{11}$phenylalkyl;

$R_{501}$ is hydrogen, substituted or unsubstituted $C_1$–$C_{18}$alkyl, $C_2$–$C_{18}$alkenyl, $C_2$–$C_{18}$alkinyl, $C_3$–$C_{20}$cycloalkyl, phenyl, O($C_1$–$C_{18}$alkyl), O($C_2$–$C_{18}$alkeny), $C_7$–$C_{11}$phenylalkyl, O-phenyl, O-$C_7$–$C_9$phenylalkyl or halogen, CN, COOR$_{500}$, CONR$_{500}$R$_{500}$;

$Q_5$ is $CR_{502}R_{503}$, CH=CH$_2$, $(CR_{502}R_{503})_n$, $CR_{504}$=$CR_{505}$-$CR_{506}R_{507}$, $(CR_{504}$=$CR_{505}$-$CR_{506}R_{507})_n$, C≡$CR_{508}R_{509}$, (C≡$CR_{508}R_{509})_n$, O, C=O, NR$_{510}$, NR$_{511}$-C=O, O-C(O)-O, SO$_2$, S, SiR$_{512}$R$_{513}$, O-SiR$_{512}$R$_{513}$-O;

$R_{502}$, $R_{503}$, $R_{504}$, $R_{505}$, $R_{506}$, $R_{507}$, $R_{508}$, $R_{509}$, $R_{510}$, $R_{511}$, $R_{512}$ and $R_{513}$ independently of each other are hydrogen, substituted or unsubstituted $C_1$–$C_{18}$alkyl, $C_2$–$C_{18}$alkenyl, $C_2$–$C_{18}$alkinyl, $C_3$–$C_7$cycloalkyl, phenyl, O($C_1$–$C_{18}$alkyl), O($C_2$–$C_{18}$alkeny), $C_7$–$C_{11}$phenylalkyl, O-phenyl, O-$C_7$–$C_9$phenylalkyl or halogen;

n is a number from 1 to 10;

y is a number from 1 to 25000 and;

z is a number from 0 to 25000.

Preferably $R_{501}$, is H or methyl; $Q_5$ is $CR_{502}R_{503}$, CH=CH$_2$, $CR_{504}$=$CR_{505}CR_{506}R_{507}$, wherein $R_{502}$ and $R_{503}$ is H, methyl or $C_2$–$C_9$alkenyl and $R_{504}$, $R_{505}$, $R_{506}$ and $R_{507}$ are independently H or methyl.

Examples for the different substituents have been already given.

Within this selection polyethylene, polypropylene and polybutadiene, SBS and EPDM are especially preferred.

A further subject of the invention is a polymer of formula (P2) obtainable by step B) of the above process:

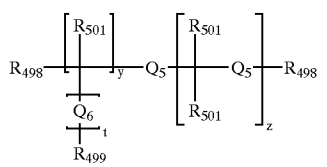

(P2)

Definitions and examples of the substituents are as given above;

$Q_6$ is a homo-, co- or tapered polymer resulting from the monomers as described above, t is a number from 0 to 25000.

$R_{499}$ may be removed thermally or chemically.

Preferably the polymer (P2) is grafted with a monomer selected from the groups described above and more preferably with styrenes, (meth)acrylates, butadiene, isoprene.

Most preferred are SB-g-styrenes, SB-g-(meth)acrylates, SI-g-styrenes, SI-g-(meth)acrylates, SBS-g-styrenes, SBS-g-(meth)acrylates, EPDM-g-styrenes, EPDM-g-(meth)acrylates.

Examples and preferences have been already given.

A further subject of the present invention is the use of a nitroxy-ether containing a group (>NO-X), wherein X is selected such that cleavage of the O-X bond occurs and a radical X• is formed at about the melting temperature of the polymer for the preparation of a grafted polymer with and without a free radical source.

Still further subjects are the use of a grafted polymer according to step A) of the above described process as macroinitiator for radical polymerization, and the use of the polymer obtained according to the process as adhesive or as compatibilizer for polymer blends or as polymer toughening agent.

The following examples illustrate the invention.

A) Grafting of N-OR Compounds to the Polymer (Preparation of a Polymeric Initiator)

Polypropylene ($MFR_{230/2.16}$=1.43 according to ISO 1133) is extruded together with the compounds given in Table 2 in a twin screw extruder (TW 100 of Haake, Germany) at 180–210° C. (heating zones 1–5) and 40 rpm. The melt viscosity (MFR) is determined according to ISO 1133 (Table 1).

The granulated polymer is dissolved, reprecipitated and high temperature NMR spectra are taken to determine whether polymer bound NO-moieties are present.

TABLE 1

Grafting of N-OR to polypropylene

| Example | Additives | Polymer bound NO [%] | $MFR_{(230/2.16)}$ |
|---------|-----------|----------------------|--------------------|
| A1 | 1.0% compound 1 | 0.26 | 2.03 |
| A2 | 1.5% compound 1 | 0.37 | 2.14 |
| A3 | 1.0% compound 1 + 0.2% peroxide[1] | 0.37 | 2.89 | compound 1: 1-allyloxy-4-propoxy-2,2,6,6-tetramethylpiperidine
peroxide 1: 2,5-dimethyl-2,5-di(tert.butylperoxy)hexane on chalk (45%)
*MFR according to ISO 1133

B) Grafting of N-OR to the Polymer and Subsequent Polymer Analogous Reaction

Commercially available SBS (styrene/butadiene/styrene copolymer, Kraton D 1102 CU, supplier: Shell) is extruded together with the compound given in Table 2 in a twin screw extruder (TW 100 of Haake, Germany) at 180–210° C. (heating zones 1–5) and 40 rpm.

In an evacuated Schlenk reactor, purged with argon, 5 g of the granulated polymer is dissolved in 50–100 mL monomer under argon atmosphere. Dissolved oxygen is removed in freeze-thaw-cycles (liquid nitrogen). The reaction mixture is stirred and heated under argon atmosphere. Remaining monomer is removed under vacuum and the residue is dried under vacuum until constant weight is achieved. Molecular weights and molecular weight distributions are determined by gel permeation chromatograpgy (GPC). The results are shown in Table 3.

TABLE 2

Grafting of N-OR to the polymer

| Example | Polymer type | Additives | Molecular weight (MP*, GPC) |
|---------|--------------|-----------|------------------------------|
| Comparison 1 | SBS | not processed | 105.500 |
| Starting material for inventive example 1 + 2 | SBS | 0.25% compound 2 | 106.700 | compound 2: benzoic acid 1-cyclohexyloxy-2,2,6,6-tetramethyl-piperidin-4-yl ester
*bimodal distribution; peak molecular weight (Mp) from high MW peak

TABLE 3

Polymeranalogous reactions

| Example | Polymer type | Monomer | Reaction conditions | Molecular weight (Mp*, GPC) |
|---------|--------------|---------|---------------------|------------------------------|
| Comparson 2 | SBS | styrene | 1 h, 130° C. | 102.700 |
| Inventive example 1 | SBS | styrene | 1 h, 130° C. | 112.200** |
| Inventive example 2 | SBS | styrene | 4 h, 130° C. | 267.400** |

*bimodal distribution; peak molecular weight (Mp) from high MW peak
**tailing in high MW area

What is claimed is:

1. A process for preparing a grafted polymer where in a first step

A) a stable nitroxyl radical is grafted onto a polymer, which step comprises heating a polymer and a nitroxylether containing a group (>NO-X) to a temperature between 150° C. and 300° C. in a reactor suitable for mixing a polymer melt, wherein X is selected such that cleavage of the O-X bond occurs and a radical X• is formed at about the melting temperature of the polymer; and in a second step B) the grafted polymer of step A) is heated in the presence of an ethylenically unsaturated monomer or oligomer to a temperature at which cleavage of the nitroxylpolymer bond occurs and polymerization of the ethylenically unsaturated monomer or oligomer is initiated at the polymer radical; maintaining said temperature for further polymerization and afterwards cooling down the mixture to a temperature below 60° C., wherein X is selected from the group consisting of $C_1$–$C_{18}$alkyl, $C_3$–$C_{18}$alkenyl, $C_3$–$C_{18}$alkinyl, phenyl, phenyl ($C_7$–$C_{11}$)alkyl, phenyl or phenyl($C_7$–$C_{11}$)alkyl substituted by $C_1$–$C_{12}$alkyl, $C_1$–$C_{12}$alkoxy, OH, amino, $C_1$–$C_{12}$alkylamino, $C_1$–$C_{12}$dialkylamino, $NO_2$ or halogen, $C_2$–$C_7$cycloalkyl, or a group

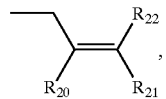

wherein $R_{20}$, $R_{21}$, and $R_{22}$ are hydrogen or $C_1$–$C_{12}$alkyl, $C_2$–$C_{12}$alkenyl, phenyl or $C_3$–$C_7$cycloalkyl.

2. A process according to claim 1, wherein a free radical source is additionally present.

3. A process according to claim 2, wherein the free radical source is a bis-azo compound, a peroxide or a hydroperoxide.

4. A process according to claim 3 wherein the free radical source is 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononanoate, 2,5-dimethylhexane 2,5-dibenzoate, t-butyl peracetate, t-amyl perbenzoate, t-butyl perbenzoate, 2,2-bis(t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl) benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

5. A process according to claim 1 wherein the polymer is polyethylene, polypropylene, polystyrene, styrene block-copolymers, polybutadiene or polyisoprene, EPDM (ethylene-propylene diene monomer) or EPR (ethylene-propylene rubber).

6. A process according to claim 1, wherein the nitroxyl-ether contains a structural element of formula (XXX):

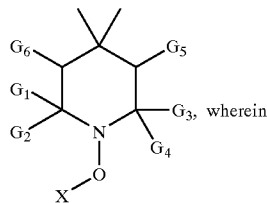

(XXX)

$G_1$, $G_2$, $G_3$, $G_4$ are independently $C_1$–$C_6$alkyl or $G_1$ and $G_2$ or $G_3$ and $G_4$, or $G_1$ and $G_2$ and $G_3$ and $G_4$ together form a $C_5$–$C_{12}$cycloalkyl group;

$G_5$, $G_6$ independently are H, $C_1$–$C_{18}$alkyl, phenyl, naphthyl or a group $COOC_1$–$C_{18}$alkyl.

7. process according to claim 6, wherein the nitroxyl-ether is of the formula A:

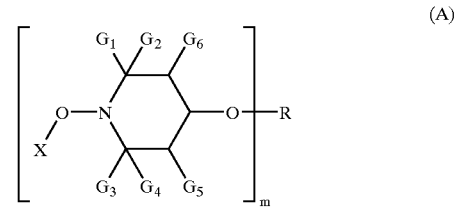

(A)

wherein m is 1, 2, 3 or 4, $G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$–$C_4$ alkyl;

R, if m is 1, is hydrogen, $C_1$–$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 -$COOZ_{12}$ groups, in which $Z_{12}$ is H, $C_1$–$C_{20}$alkyl, $C_3$–$C_{12}$alkenyl, $C_5$–$C_7$cycloalkyl, phenyl or benzyl; or R is a monovalent radical of a carbamic acid or phosphorus-containing acid or a monovalent silyl radical;

R, if m is 2, is $C_2$–$C_{12}$alkylene, $C_4$–$C_{12}$alkenylene, xylylene, a divalent radical of an aliphatic dicarboxylic acid having 2 to 36 carbon atoms, or a cycloaliphatic or aromatic dicarboxylic acid having 8–14 carbon atoms or of an aliphatic, cycloaliphatic or aromatic dicarbamic acid having 8–14 carbon atoms, where each dicarboxylic acid may be substituted in the aliphatic, cycloaliphatic or aromatic moiety by one or two -$COOZ_{12}$ groups; or R is a divalent radical of a phosphorus-containing acid or a divalent silyl radical;

R, if m is 3, is a trivalent radical of an aliphatic, cycloaliphatic or aromatic tricarboxylic acid, which may be substituted in the aliphatic, cycloaliphatic or aromatic moiety by -$COOZ_{12}$, of an aromatic tricarbamic acid or of a phosphorus-containing acid, or is a trivalent silyl radical; and R, if m is 4, is a tetravalent radical of an aliphatic, cycloaliphatic or aromatic tetracarboxylic acid.

8. A process according to claim 6, wherein $G_1$, $G_2$, $G_3$ and $G_4$ are methyl and $G_5$ and $G_6$ are hydrogen.

9. A process according to claim 1, wherein X is selected from the group consisting of $C_1$–$C_{18}$alkyl, benzyl, allyl, cyclopentyl or cyclohexyl.

10. A process according to claim 7, wherein the nitroxylether is of the formula A:
wherein
m is 1 and
R is hydrogen, $C_1$–$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or of an α,β-unsaturated carboxylic acid having 3 to 5 carbon atoms or of an aromatic carboxylic acid having 7 to 15 carbon atoms.

11. A process according to claim 10, wherein the nitroxylether is of the formula A:
wherein
R is hydrogen, $C_1$–$C_{18}$alkyl, cyanoethyl, benzoyl, glycidyl or a monovalent radical of an aliphatic carboxylic acid of 2 to 18 carbon atoms.

12. A process according to claim 1, wherein the polymer to be grafted on contains unsaturated moieties selected from the group consisting of polydienes, co-, block-, random- and tapered polymers of styrene, terpolymers with diolefins and copolymers with diolefins.

13. A process according to claim 1, wherein the ethylenically unsaturated monomer or oligomer is selected from the group consisting of styrene, substituted styrene, conjugated dienes, acrolein, vinyl acetate, (alkyl)acrylic acidanhydrides, (alkyl)acrylic acid salts, (alkyl)acrylic esters or (alkyl)acrylamides.

14. A process according to claim 13, wherein the ethylenically unsaturated monomer is styrene, α-methyl styrene, p-methyl styrene or a compound of formula $CH_2$=$C(R_a)$-(C=Z)-$R_b$, wherein $R_a$ is hydrogen or $C_1$–$C_4$alkyl, $R_b$ is $NH_2$, $OCH_3$, glycidyl, unsubstituted $C_1$–$C_{18}$alkoxy or hydroxy-substituted $C_1$–$C_{18}$alkoxy, unsubstituted $C_1$–$C_{18}$alkylamino, di($C_1$–$C_{18}$alkyl)amino, hydroxy-substituted $C_1$–$C_{18}$alkylamino or hydroxy-substituted di($C_1$–$C_{18}$alkyl)amino; and Z is oxygen or sulfur.

15. A process according to claim 1, wherein the temperature in the second step B) is from 70° to 280° C.

16. A process according to claim 1, wherein the nitroxylether is present in an amount of from 0.1% to 30% based on the weight of the polymer.

17. A process according to claim 1, wherein the ratio of the reaction product of step A) to the ethylenically unsaturated monomer or oligomer added in step B) is from 1:10000 to 10:1.

18. A process according to claim 1, wherein the first step A) is performed in an extruder.

19. A polymeric radical initiator obtainable according to step A) of claim 1.

20. A polymer obtainable according to steps A) and B) of the process of claim 1.

21. An adhesive or a compatibilizer for polymer blends or a polymer toughening agent prepared according to claim 1.

22. A polymeric radical initiator obtained according to step A) of claim 2.

23. A polymer obtained according to steps A) and B) of the process of claim 2.

24. An adhesive or a compatibilizer for polymer blends or a polymer toughening agent prepared according to claim 2.

* * * * *